United States Patent Office  2,830,028
Patented Apr. 8, 1958

2,830,028

INORGANIC HYDRAZINE-SULFONATES, COMPOSITION CONTAINING SAME AND METHOD OF PREPARING

Mario Scalera, Somerville, and Frederic H. Adams and William B. Hardy, Bound Brook, N. J., assignors to American Cyanamid Company, New York, N. Y., a corporation of Maine No Drawing. Application April 28, 1955
Serial No. 504,654

12 Claims. (Cl. 260—2.5)

The present invention relates to cellular polymeric materials and the preparation thereof. More particularly, it relates to natural and synthetic cellular rubber materials and other expanded organoplastics and the preparation thereof. Still more particularly, it relates to such cellular materials prepared by using a new class of blowing agents which comprise inorganic salts of hydrazine sulfonic acid.

Cellular polymeric materials are prepared by incorporating in an organoplastic a material known as a blowing agent which at an elevated temperature decomposes to a gaseous product. However, not all materials which decompose on heating to form a gaseous product are necessarily suitable for use in the manufacture of blown organoplastics. To be considered a useful blowing agent, a material must meet certain requirements.

For instance, while such a material should be unstable at the curing temperature of any particular organoplastic material being treated, it should be stable on storage, transportation, and handling. The instability of the material, however, should not be such as to decompose explosively within the treating temperature range. In the treatment of rubber, moreover, decomposition should not occur until partial vulcanization has occured so that the rubber stock has sufficient strength to retain the gaseous decomposition product. On the other hand, vulcanization should not have proceeded to such an extent prior to decomposition that cell formation is restricted.

In the manufacture of cellular rubber products, the blowing agent must be capable of dispersing evenly in the rubber to produce small and uniform cells. Complete evolution of the gaseous decomposition product should occur prior to completion of vulcanization to produce a product of as low density as possible. Still further, a blowing agent must not interfere chemically with vulcanization accelerators or other materials used in the process of vulcanization. A blowing agent itself should not accelerate the vulcanization process since incomplete blowing will accompany premature vulcanization.

A blowing agent should be non-toxic and odorless. Similarly, the decomposition product thereof should also be odorless and without physiological effect. Moreover, both the blowing agent and its decomposition product should preferably be substantially colorless thereby permitting its use in the manufacture of all types of cellular products including those which must be light in color and free of stain.

In the past, inorganic and organic compounds have been employed with varying degrees of success as blowing agents. Among the former might be mentioned ammonium carbonate, ammonium sulfite, sodium nitrite, sodium bicarbonate, and the like. Among the organic compounds which have been found successful to varying degrees as blowing agents are urea and various derivatives, various diazoamino derivatives, certain azo nitriles and particularly hydrazine, organic derivatives thereof, and addition compounds of hydrazine with various acids.

It has now been discovered that divalent metal salts of hydrazine sulfonic acid are unusually effective as blowing agents, particularly in the preparation of cellular rubber products. The blowing agents of this invention may be represented by the formula:

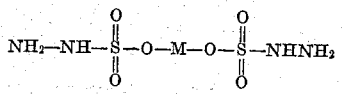

wherein M is a metal selected from the group consisting of zinc, magnesium and cadmium.

A particularly outstanding advantage of the blowing agents of this invention is the fact that they do not have objectionable physiological properties. They do not operate as skin irritants or skin sensitizers resulting in objections from those who are obliged to handle the materials. That the blowing agents of this invention are free of this disadvantage is particularly surprising because hydrazine and its salts heretofore employed as blowing agents are poisonous and must be kept from contact with the lungs and skin of those obliged to handle them. An additional unexpected advantage of the blowing agents of this invention is the fact that they may be directly incorporated simultaneously with sulfur during the compounding of rubber without fear of interaction between the two. This is in direct contrast to the use of hydrazine and its salts as blowing agents which must be added to rubber at a time separate from that of sulfur addition to avoid reaction therewith.

A still further advantage of the blowing agents of this invention is the fact that they may be readily prepared by known methods. A preferred method is that described in Berichte 59, 1976–83. This method describes the preparation by the sulfonation of hydrazine or hydrazine hydrate using as sulfonating agents trialkylsulfamidic acids. Hydrazine sulfonic acid is thus isolated as the barium salt. Other metal salts of hydrazine sulfonic acid in accordance with this invention may then be prepared from the barium salt. A particularly satisfactory manner is by treating the barium salt with other metallic inorganic salts, particularly the soluble sulfates. The resultant insoluble barium sulfate may be simply removed by filtration or other conventional means. The resultant metal salt of hydrazine sulfonic acid may then be isolated by any of various conventional methods.

All of the blowing agents of this invention are colorless, crystalline solids soluble in water. They are readily dispersible in rubber and other organoplastics and easy to handle, measure and control. They find particular use in the preparation of blown products prepared from natural rubber and rubber-like polymers and copolymers of butadiene-1,3. In the preparation of such blown rubber products, as little as 0.5% by weight on the rubber may be employed. Products of lower density will be obtained with greater amounts of blowing agent. In general, the amount of blowing agent employed with rubber will vary from about 0.5% to about 4% on the rubber, preferably from about 1% to about 3%.

The blowing agents of this invention also find use in the preparation of cellular plastic materials prepared, for instance, from urea-aldehyde resins, phenol-aldehyde resins, melamine-aldehyde resins, vinyl polymers and the like. In blowing such organoplastic materials the amount of blowing agent required will usually be greater than that used in the blowing of rubber. In general, the amount of blowing agent employed will vary from about 10% to about 30% by weight on the resin depending on the particular resin being treated, the particular blowing agent, the degree of blow desired and the like.

The following examples will further describe the invention. These examples are intended to be illustrative only and not by way of limitation. All parts are by weight unless otherwise noted.

EXAMPLE 1

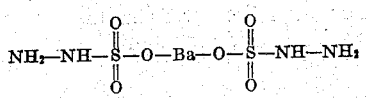

To 5 parts of hydrazine hydrate is added 35 parts of water, 9.1 parts of triethylsulfamidic acid and the mixture stirred and warmed until solution is obtained. The solution is then added to 12 parts of barium hydroxide octahydrate and the mixture evaporated on a steam bath, the last part of the evaporation being carried out under vacuum. The residue is washed twice with ethanol, dissolved in 100 parts of water and carbon dioxide introduced until a test of the mixture is negative to phenolphthalein but positive to brilliant yellow indicator papers. Excess barium precipiated as barium carbonate is removed by filtration, the filtrate evaporated to about 45 parts by volume and an equal volume of 3A ethyl alcohol added. The product, barium hydrazine sulfonate, precipitates and precipitation completed on cooling. The product is separated by filtration and dried.

EXAMPLE 2

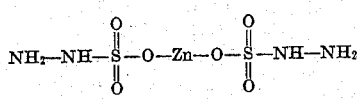

37.8 parts of the barium salt of hydrazine sulfonic acid prepared by the method of Example 1 are added to 50 parts of water and the mixture stirred and warmed until solution is obtained. This solution is then added to a solution of 28.8 parts of zinc sulfate, $ZnSO_4.7H_2O$ in 50 pars of water and thoroughly mixed. The mixture is warmed, barium sulfate removed by filtration and the filtrate cooled to precipitate the product which is isolated by filtration and dried.

EXAMPLE 3

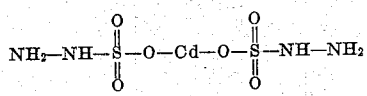

A solution of 17 parts of the barium salt prepared according to Example 1 in 25 parts of hot water is mixed with a solution of 11.5 parts of cadmium sulfate, $(CdSO_4)_3.8H_2O$, in 20 parts of hot water. The mixture is stirred and heated, precipitated barium sulfate removed by filtration and the filtrate cooled to 5° C. to crystallize cadmium hydrazinesulfonate which is isolated by filtration and dried.

EXAMPLE 4

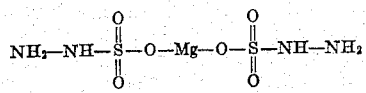

A solution of 6.75 parts of barium hydrazinesulfonate prepared according to Example 1 in 20 parts of hot water is mixed with a solution of 4.4 parts of magnesium sulfate, $MgSO_4.7H_2O$, in 20 parts of water. After digestion by heating, the precipitated barium sulfate is removed by filtration and the filtrate evaporated to dryness. On cooling and standing, the magnesium hydrazinesulfonate solidifies to a hard white solid.

EXAMPLE 5

Rubber stocks containing as blowing agents the compounds and amounts thereof as listed in Table I were compounded according to the following composition:

| Compound: | Parts |
|---|---|
| Plasticised rubber (20–25 Mooney ML–4 at 212° F.) | 100 |
| Stearic acid | 2 |
| Zinc oxide | 5 |
| Keystone whiting | 50 |
| Unitane O–220 (titanium dioxide) | 15 |
| Light process oil (softener) | 10 |
| Petrolatum | 3 |
| 2,2' - methylene - bis - (4 - methyl - 6 - t - butylphenol) | 0.5 |
| Sulfur | 3 |
| Benzothiazolyl disulfide | 0.6 |
| Di-o-tolyl guanidine | 0.15 |

Samples of each stock were blown at 153° C. for 35 minutes. The mold size was 6 cubic inches and each sample 51 grams. The results shown in Table I with respect to completion of blow and cell structure are explained by the following legend.

| Completion of Blow | Cell Structure |
|---|---|
| C—mold completely filled by blown product. SRC—mold completely filled by blown product except for slightly rounded corners. | F—fine. MF—medium fine. |

Table I

| Salt of Hydrazinesulfonic Acid | Amount (Gr.) | Decomp. T., °C. | Blow | Cell |
|---|---|---|---|---|
| Zinc | 1.2 | 112 | C | MF |
| Magnesium | 1.5 | 119 | SRC | MF |
| Cadmium | 1.5 | 203 | SRC | MF |

The varying amounts of blowing agents employed are such as to give active equivalent nitrogen contents. Addition of the blowing agents was made along with sulfur and the various other compounding materials with no interaction. The data of Table I indicate that the blowing agents according to this invention give a completely or substantially completely blown product of uniform fine or medium fine cell structure.

Copending application for U. S. Letters Patent Serial No. 504,658 of the applicants herein filed of even date is noted.

We claim:

1. A process of producing cellular rubber which comprises incorporating into an unvulcanized, vulcanizable rubber composition selected from the group consisting of natural rubber and rubber-like polymers of butadiene-1,3 a divalent metal salt of hydrazinesulfonic acid having the formula:

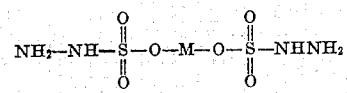

in which M is selected from the group consisting of zinc, magnesium and cadmium, and heating resultant mixture to a temperature sufficient to decompose the blowing agent and cure the rubber, the metal salt of hydrazine sulfonic acid being in amount sufficient to produce cellular rubber.

2. A process according to claim 1 in which the metal is zinc.

3. A process according to claim 1 in which the metal is magnesium.

4. A process according to claim 1 in which the metal is cadmium.

5. An unvulcanized, vulcanizable rubber composition selected from the group consisting of natural rubber and rubber-like polymers of butadiene-1,3 having incorporated therein a divalent metal salt of hydrazine sulfonic acid of the formula:

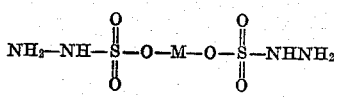

in which M is selected from the group consisting of zinc, magnesium and cadmium.

6. A composition according to claim 5 in which the metal is zinc.

7. A composition according to claim 5 in which the metal is magnesium.

8. A composition according to claim 5 in which the metal is cadmium.

9. As new compounds, divalent metal salts of hydrazine sulfonic acid in which the metal is selected from the group consisting of zinc, magnesium and cadmium.

10. Zinc hydrazine sulfonate.
11. Magnesium hydrazine sulfonate.
12. Cadmium hydrazine sulfonate.

References Cited in the file of this patent

UNITED STATES PATENTS

| | | |
|---|---|---|
| 2,552,065 | Schoene | May 8, 1951 |
| 2,626,280 | Hunter | Jan. 20, 1953 |
| 2,626,933 | Lober et al. | Jan. 27, 1953 |
| 2,673,220 | Hunter | Mar. 23, 1954 |